UNITED STATES PATENT OFFICE.

OTTO SOHST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

YELLOW TO RED ACRIDIN DYE AND PROCESS OF MAKING SAME.

SPECIFICATION forming part of Letters Patent No. 712,421, dated October 28, 1902.

Application filed April 4, 1902. Serial No. 101,315. (Specimens.)

*To all whom it may concern:*

Be it known that I, OTTO SOHST, Ph. D., a citizen of the Empire of Germany, residing at Höchst-on-the-Main, Germany, have invented certain new and useful Yellow to Red Acridin Dyes and Process of Making the Same, of which the following is a specification.

Benzyl derivatives of acridins have hitherto not been known.

I have found that acridins in alpha position—that is to say, those benzylated at the nitrogen nucleus and having the general formula:

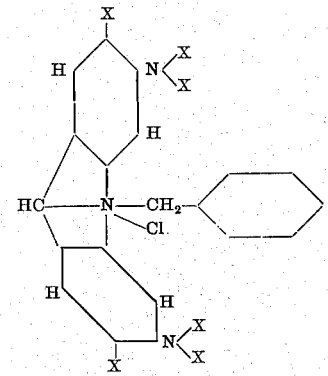

are valuable dyestuffs, which may easily be obtained by heating the corresponding acridin bases, of the general formula:

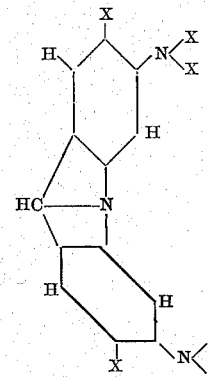

with benzyl chlorid in the presence or absence of an indifferent solvent, such as nitrobenzene. The dyestuffs thus obtained are orange-yellow to brown-red powders and are distinguished by the purity of their shades and the fastness to soda and ammonia characteristic of acridinium compounds.

Example 1: Twelve kilos of acridin yellow (dye base) are heated to about 100° to 120° centigrade with fifty kilos of nitrobenzene, seven kilos of benzyl chlorid being then added, the temperature being then raised to 140° to 150° centigrade, and after about a quarter of an hour's reaction the mass is poured into water and the nitrobenzene expelled by steam. The remaining yellow solution is filtered and the dyestuff is precipitated from the filtrate by adding a slight excess of hydrochloric acid and common salt. When dry, the dyestuff is an orange-yellow powder readily soluble in hot water and dyeing mordanted cotton greenish yellow.

Example 2: Twelve kilos of acridin yellow (dye base) are well mixed with seven kilos of benzyl chlorid, and the moist powder thus obtained is heated for about three-fourths of an hour on an oil-bath (160° centigrade in the oil) in a vessel provided with a reflux condenser. On completion of the reaction the mixture is boiled with water, filtered, and the dyestuff is precipitated from the filtrate by an excess of hydrochloric acid and common salt. The dyestuff is identical with the product obtained from acridin yellow by the method described in Example 1.

If in these examples the same quantity of acridin orange dye base be substituted for acridin yellow, a brown-red powder is obtained, which is easily soluble in water, dyeing mordanted cotton orange-red shades.

Having now described my invention, what I claim is—

1. The herein-described process of making new acridinium compounds, which consists in treating acridin dyestuffs of the general formula:

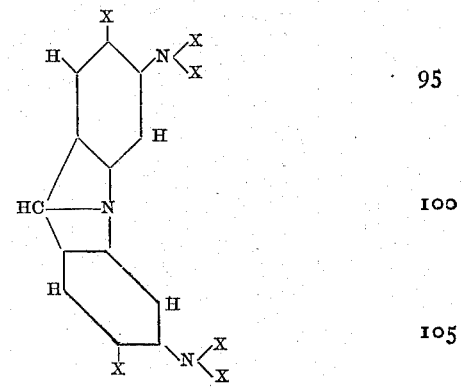

(wherein X means hydrogen or alkyl) with benzyl chlorid, substantially as set forth.

2. As new products dyestuffs of the formula:

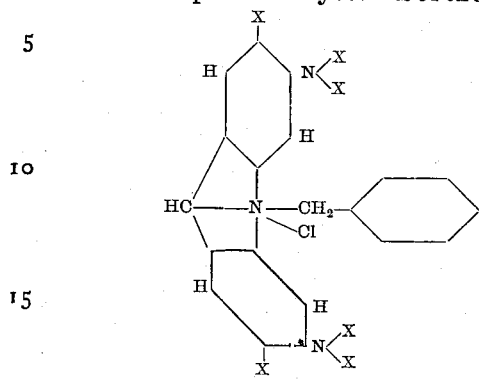

being orange-yellow to brown-red powders, soluble in hot water, soluble with difficulty in alcohol with a yellow-green fluorescence, insoluble in ether and benzene; they are distinguished by the clearness of their shade, having the fastness to sodium carbonate and ammonia characteristic of acridinium compounds.

In testimony that I claim the foregoing as my invention I have signed my name in presence of two subscribing witnesses.

OTTO SOHST.

Witnesses:
 ALFRED BRISBOIS,
 BERNHARD LEYDECKER.